United States Patent
Mori

(10) Patent No.: US 11,192,742 B2
(45) Date of Patent: Dec. 7, 2021

(54) SHEET CONVEYANCE APPARATUS AND IMAGE FORMING APPARATUS

(71) Applicant: CANON KABUSHIKI KAISHA, Tokyo (JP)

(72) Inventor: Eikou Mori, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 16/157,350

(22) Filed: Oct. 11, 2018

(65) Prior Publication Data

US 2019/0127167 A1 May 2, 2019

(30) Foreign Application Priority Data

Oct. 26, 2017 (JP) .............................. JP2017-207517
Feb. 28, 2018 (JP) .............................. JP2018-034336
Jul. 20, 2018 (JP) .............................. JP2018-136767

(51) Int. Cl.
*B65H 7/20* (2006.01)
*B65H 5/06* (2006.01)
*G03G 15/00* (2006.01)
*H02P 29/02* (2016.01)

(52) U.S. Cl.
CPC .............. *B65H 7/20* (2013.01); *B65H 5/062* (2013.01); *G03G 15/657* (2013.01); *H02P 29/02* (2013.01); *B65H 2403/92* (2013.01)

(58) Field of Classification Search
CPC ...... B65H 7/20; B65H 5/062; B65H 2403/92; H02P 21/24
See application file for complete search history.

(56) References Cited

U.S. PATENT DOCUMENTS

| 8,465,013 B2 | 6/2013 | Ashikawa | |
|---|---|---|---|
| 2017/0288590 A1* | 10/2017 | Nito | ....................... H02P 21/24 |
| 2018/0079611 A1* | 3/2018 | Kitamura | ................ H02P 21/22 |
| 2018/0152126 A1* | 5/2018 | Nito | ....................... B41J 11/007 |
| 2018/0309400 A1* | 10/2018 | Kitamura | ............... G03G 15/50 |

FOREIGN PATENT DOCUMENTS

| JP | 2014-186354 A | 10/2014 |
|---|---|---|
| JP | 2015-069068 A | 4/2015 |

* cited by examiner

*Primary Examiner* — Thomas A Morrison
(74) *Attorney, Agent, or Firm* — Venable LLP

(57) ABSTRACT

A sheet conveyance apparatus includes a first conveyor, a second conveyor provided downstream of the first conveyor, a first motor configured to drive the first conveyor, a second motor configured to drive the second conveyor, a speed determining unit configured to determine a rotation speed of a rotor of the second motor, a command determining unit configured to determine a command speed representing a target speed of the rotor of the second motor, and a controller configured to control a drive current flowing through a winding of the second motor so that a deviation between the command speed determined by the command determining unit and the rotation speed determined by the speed determining unit is decreased. The command determining unit determines the command speed based on a value corresponding to a rotation speed of a rotor of the first motor.

8 Claims, 14 Drawing Sheets

SHEET CONVEYANCE APPARATUS AND IMAGE FORMING APPARATUS

BACKGROUND OF THE INVENTION

Field of the Invention

The present invention relates to control of a motor used in a sheet conveyance apparatus and an image forming apparatus.

Description of the Related Art

In an image forming apparatus, a peripheral speed of a sheet discharge roller configured to discharge a sheet having a toner image fixed thereon by a fixing roller is controlled so as to be faster than a peripheral speed of the fixing roller. In Japanese Patent Application Laid-open No. 2015-69068, there is disclosed a configuration in which a sheet having a toner image transferred thereon by a transfer roller is deflected between the transfer roller and the fixing roller so as to prevent the fixing roller from pulling the sheet downstream, and the peripheral speed of the fixing roller is adjusted so that the amount of deflection of the sheet matches a predetermined amount. In this manner, the fixing roller is prevented from pulling the sheet having the toner image transferred thereon by the transfer roller downstream. In U.S. Pat. No. 8,465,013, there is disclosed a configuration in which torque information of torque acting on a first rotating unit is acquired to control a speed of a second rotating unit. In Japanese Patent Application Laid-open No. 2014-186354, there is disclosed a configuration in which a rotation speed of conveyance means is controlled so as to obtain a rotation speed corresponding to a predetermined steady torque value.

When the peripheral speed of the fixing roller is adjusted so that the amount of deflection of the sheet deflecting between the transfer roller and the fixing roller matches the predetermined amount, a speed difference between the peripheral speed of the fixing roller and the peripheral speed of the sheet discharge roller also changes. Specifically, in a case where the peripheral speed of the fixing roller is decreased, a relative speed of the peripheral speed of the sheet discharge roller with respect to that of the fixing roller is increased as compared to the case before the adjustment. As a result, the sheet discharge roller may slip on the surface of the sheet to damage the sheet. The present invention has a primary object to suppress damaging of a sheet.

SUMMARY OF THE INVENTION

A sheet conveyance apparatus according to the present disclosure includes a first conveyor configured to convey a sheet; a second conveyor provided adjacent to the first conveyor and downstream of the first conveyor in a conveyance direction of the sheet; a first motor configured to drive the first conveyor; a second motor configured to drive the second conveyor; a speed determining unit configured to determine a rotation speed of a rotor of the second motor; a command determining unit configured to determine a command speed representing a target speed of the rotor of the second motor; and a controller configured to control a drive current flowing through a winding of the second motor so that a deviation between the command speed determined by the command determining unit and the rotation speed determined by the speed determining unit is decreased, the command determining unit being configured to determine the command speed based on a value corresponding to a rotation speed of a rotor of the first motor.

Further features of the present disclosure will become apparent from the following description of exemplary embodiments (with reference to the attached drawings).

DESCRIPTION OF THE EMBODIMENTS

Embodiments of the present disclosure are described below with reference to the drawings.

Image Forming Apparatus

Figure 1:
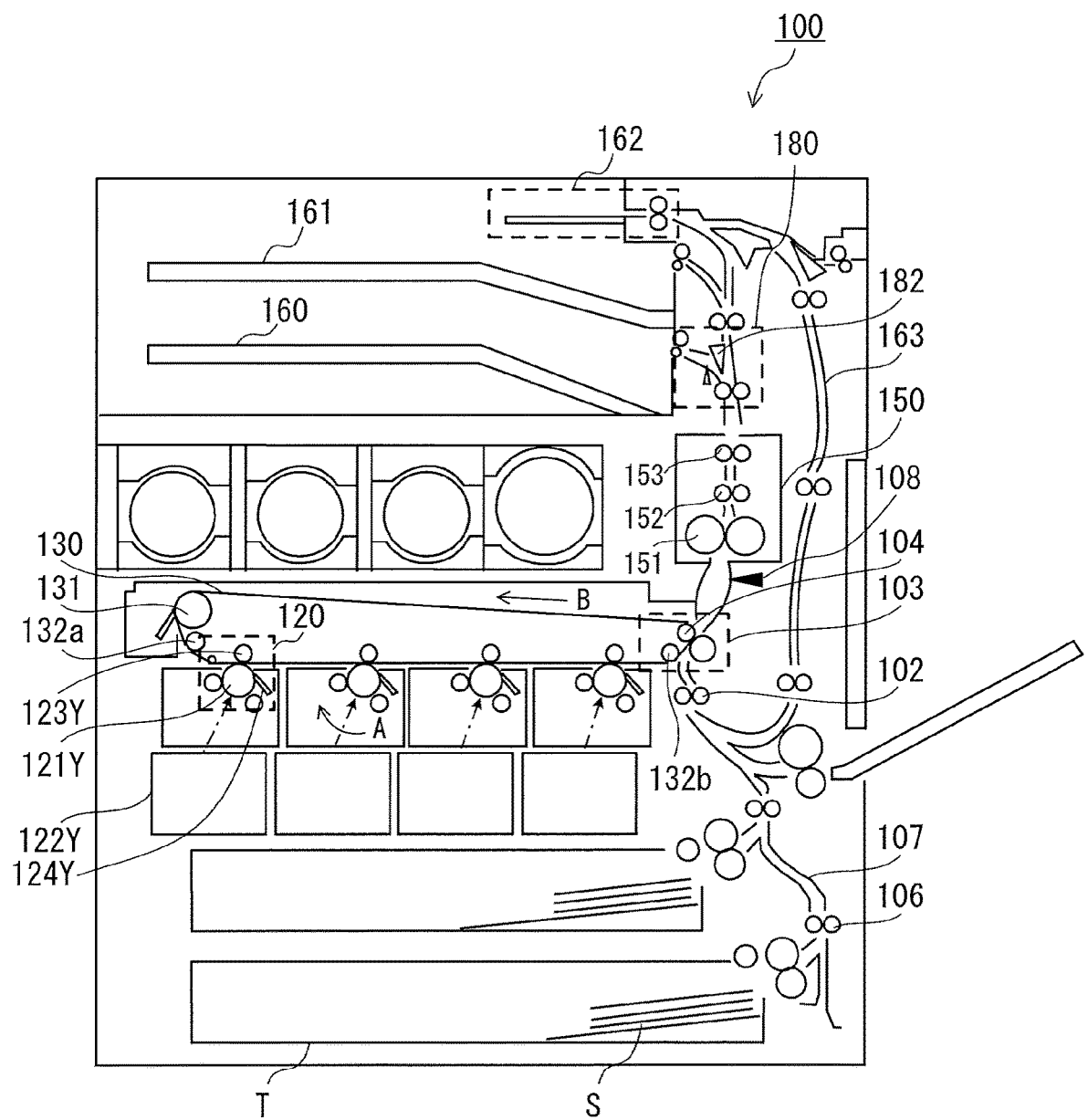
FIG. 1 is a configuration view for illustrating an image forming apparatus.

FIG. 1 is a configuration view for illustrating an image forming apparatus 100 including a sheet conveyance apparatus according to this embodiment. Sheets S on which images are to be formed are stacked on a sheet tray T serving as a sheet stacking portion. The sheets S are fed one by one by a pick-up roller so that skew feed is corrected by a registration unit including registration rollers 102. After that, the sheet S is conveyed to a secondary transfer portion 103. On a conveyance path through which the sheet S is conveyed from the sheet tray T to the registration rollers 102, sheet conveyance portions 106 (for example, roller pairs or suction belts) are arranged at appropriate intervals. On the conveyance path, a sheet guide 107 configured to guide the sheet S while controlling its behavior is provided.

The secondary transfer portion 103 includes secondary transfer rollers 104. The secondary transfer portion 103 causes the toner image to attract to the surface of the sheet S by a predetermined pressure force and an electrostatic application bias. The secondary transfer rollers 104 rotate at a predetermined peripheral speed (constant speed) corresponding to the speed at which the image is formed on the sheet S.

The image forming apparatus 100 includes image forming portions 120. Four sets of image forming portions 120 are provided so as to correspond to respective colors of yellow (Y), magenta (M), cyan (C), and black (Bk). In FIG. 1, only the yellow (Y) image forming portion is provided with reference symbols for description, but the image forming portions corresponding to the colors other than yellow have a similar configuration. The number of colors is not limited to 4. Further, the order of arrangement of the image forming portions 120 corresponding to the respective colors is not limited to the above.

The image forming portion 120 includes a photosensitive member 121Y, an exposure device 122Y, a developing device (not shown), a primary transfer portion 123Y, and a photosensitive member cleaner 124Y. The photosensitive member 121Y rotates in a direction of an arrow A in FIG. 1, and its surface is uniformly charged by a charging device (not shown). The exposure device 122Y emits light based on an image signal representing an image to be formed to expose the photosensitive member 121Y whose surface is uniformly charged. In this manner, an electrostatic latent image corresponding to the yellow image is formed on the surface of the photosensitive member 121Y. The developing device develops the electrostatic latent image formed on the photosensitive member 121Y with yellow toner. In this manner, a yellow toner image is formed on the photosensitive member 121Y. The primary transfer portion 123Y is applied with a predetermined pressure force and an electrostatic application bias to transfer the toner image onto an intermediate transfer belt 130. The photosensitive member cleaner 124Y collects toner remaining on the photosensitive member 121Y after the transfer. Magenta, cyan, and black toner images are similarly formed on the photosensitive members, and then transferred onto the intermediate transfer belt 130 by primary transfer portions.

The intermediate transfer belt 130 is stretched by rollers such as a drive roller 131 and tension rollers 132a and 132b, and is driven to be conveyed in a direction of an arrow B in FIG. 1. The four sets of image forming portions 120 each perform an image forming process for each color at a timing at which the toner image formed at the image forming portion upstream with respect to the rotation direction of the intermediate transfer belt 130 is superimposed on the toner image formed at the image forming portion downstream in the rotation direction. As a result, a full-color toner image is formed on the intermediate transfer belt 130. The toner image is conveyed to the secondary transfer portion 103 by the rotation of the intermediate transfer belt 130.

The toner image formed on the intermediate transfer belt 130 is transferred onto the sheet S at the secondary transfer portion 103. The sheet S having the toner image transferred thereon is conveyed to a fixing device 150. A sensor 108 for detecting deflection of the sheet S is provided between the secondary transfer portion 103 and the fixing device 150. The fixing device 150, for example, pressurizes and heats the sheet S having the toner image transferred thereon to melt and fix the toner image to the sheet S. The sheet S having an image fixed thereon is conveyed through a path that is selected by a flapper 182 of a sheet discharge unit 180. For example, when the sheet S is directly discharged to the outside of the image forming apparatus 100, the sheet S is discharged to sheet discharge trays 160 and 161. When duplex printing is performed for image formation, the sheet S having an image formed on one surface thereof is conveyed to the registration rollers 102 via a reverse conveyance mechanism 162 and a duplex printing conveyance mechanism 163.

The above is the description of the configuration and the function of the image forming apparatus 100.

First Embodiment

Figure 2:
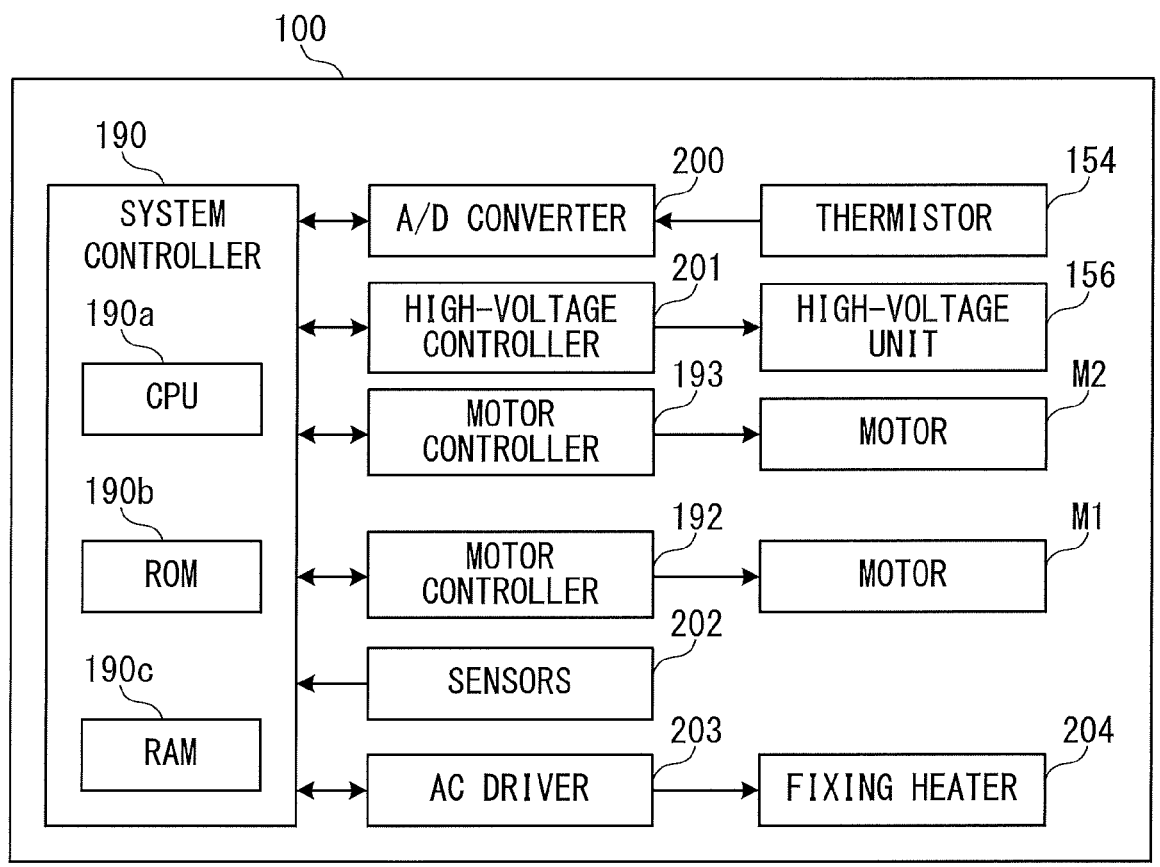
FIG. 2 is an exemplary diagram for illustrating a control configuration of the image forming apparatus.

FIG. 2 is an exemplary diagram for illustrating a control configuration of the image forming apparatus 100. A system controller 190 includes a central processing unit (CPU) 190a, a read only memory (ROM) 190b, and a random access memory (RAM) 190c. The system controller 190 is connected to an analog/digital (A/D) converter 200, a high-voltage controller 201, motor controllers 192 and 193, sensors 202, and an AC driver 203. The system controller 190 can transmit or receive data or commands to or from each connected unit.

The CPU 190a executes various programs stored in the ROM 190b to execute various sequences related to an image forming sequence defined in advance. The RAM 190c is a storage device. The RAM 190c stores, for example, various kinds of data such as setting values for the high-voltage controller 201 and command values for the motor controllers 192 and 193.

The system controller 190 receives signals from the sensors 202 to set setting values for the high-voltage controller 201 based on the received signals. The high-voltage controller 201 supplies a voltage required for a high-voltage unit 156 (for example, the charging device, the developing device, and the secondary transfer portion 103) in accordance with the setting values set by the system controller 190.

The motor controllers 192 and 193 respectively control motors M1 and M2 each configured to drive a load in accordance with the command output from the CPU 190a. In FIG. 2, only motors M1 and M2 are illustrated as the motors of the image forming apparatus 100, but the present disclosure is not limited thereto. Further, one motor controller may control a plurality of motors. Moreover, in FIG. 2, only two motor controllers are provided, but the present disclosure is not limited thereto.

The A/D converter 200 receives a detection signal detected by a thermistor 154 configured to detect a temperature of a fixing heater 204, and converts the detection signal from an analog signal to a digital signal to transmit the digital signal to the system controller 190. The system controller 190 controls the AC driver 203 based on the digital signal received from the A/D converter 200. The AC driver 203 controls the fixing heater 204 so that the temperature of the fixing heater 204 becomes a temperature required for performing fixing processing. The fixing heater 204 is a heater to be used for the fixing processing, and is included in the fixing device 150.

As described above, the system controller 190 controls the operation sequence of the image forming apparatus 100.

Fixing Device and Sheet Discharge Unit

Figure 3:
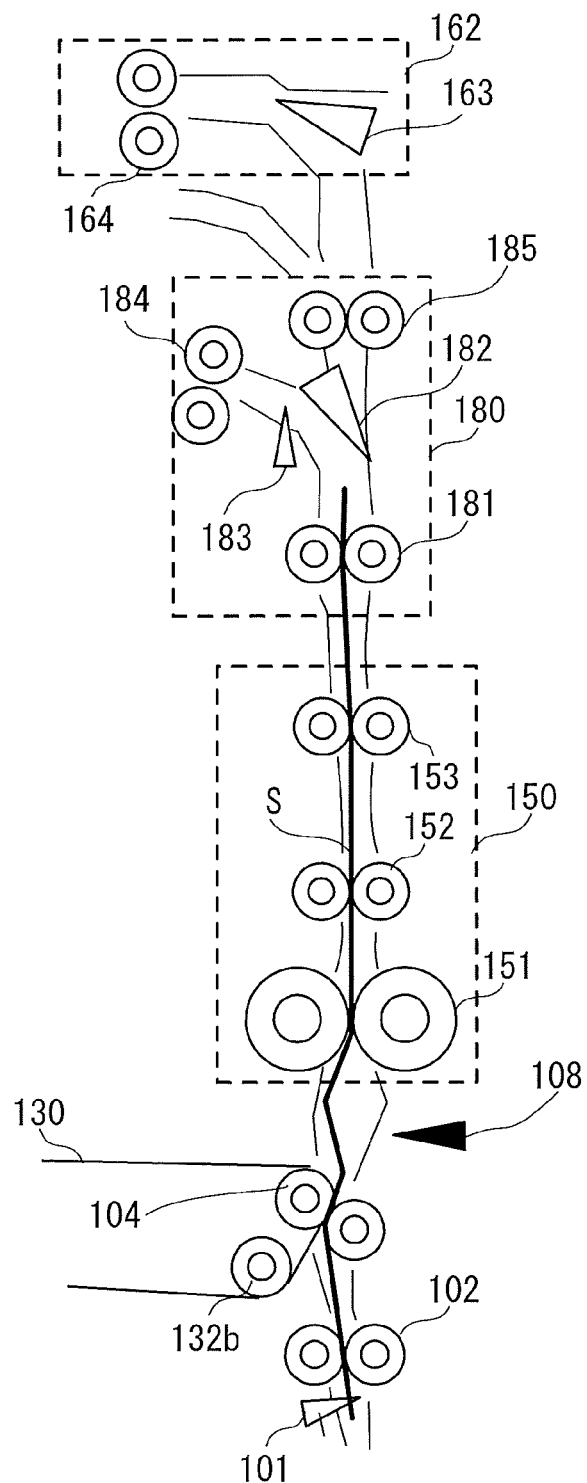
FIG. 3 is a configuration view for illustrating a secondary transfer portion, a fixing device, and a sheet discharge unit.

FIG. 3 is a configuration view for illustrating the secondary transfer portion 103, the fixing device 150, and the sheet discharge unit 180. As illustrated in FIG. 3, the fixing device 150 includes fixing rollers 151, internal sheet discharge rollers 152, and fixing sheet discharge rollers 153.

The fixing rollers 151 are rotary members configured to, for example, pressurize and heat the sheet S to melt and fix the toner image to the sheet S. When the sheet S conveyed by the secondary transfer rollers 104 is nipped by the fixing rollers 151, the fixing rollers 151 are rotated at a peripheral speed that is slower than the peripheral speed of the secondary transfer rollers 104. As a result, the sheet S deflects between the secondary transfer rollers 104 and the fixing rollers 151. Therefore, the fixing rollers 151 are prevented from pulling the sheet S having the toner image transferred thereon by the secondary transfer rollers 104 in the downstream direction.

An amount of deflection (loop amount) of the sheet S is detected by the sensor 108. In the first embodiment, for example, in a case where the loop amount detected by the sensor 108 reaches a predetermined amount, the fixing rollers 151 are controlled to be driven so that the peripheral speed becomes a peripheral speed that is the same as that of the secondary transfer rollers 104. The peripheral speed of the fixing rollers 151 varies due to expansion caused by heat at the time of the fixing processing and contraction caused by the sheet S taking the heat. As a result, the amount of deflection (loop amount) of the sheet S varies.

When the sheet S has an excessively large loop amount, the deflected sheet S may be brought into contact with the fixing rollers 151. In the first embodiment, for example, in a case where the loop amount exceeds the maximum value of a predetermined range, the fixing rollers 151 are controlled to be driven so that the peripheral speed becomes faster than the peripheral speed of the secondary transfer rollers 104. As a result, the loop amount of the sheet S is decreased. Further, in a case where the loop amount becomes smaller than the minimum value of the predetermined range, the fixing rollers 151 are controlled to be driven so that the peripheral speed becomes slower than the peripheral speed of the secondary transfer rollers 104. As a result, the loop amount is increased.

As described above, the rotation speed of the fixing rollers 151 is controlled (adjusted) so as to maintain a state in which the loop amount of the sheet S is within the predetermined range.

Figure 4:
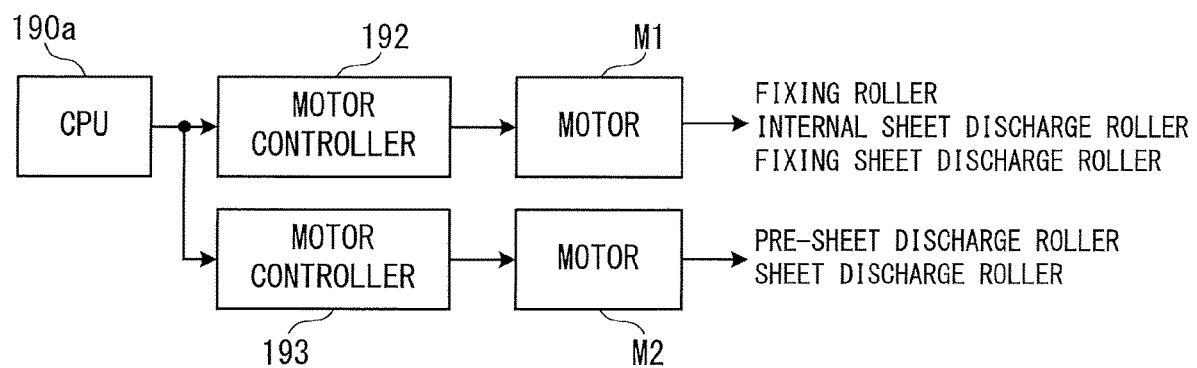
FIG. 4 is an exemplary diagram for illustrating a control configuration for performing drive control of the fixing device and the sheet discharge unit.

FIG. 4 is an exemplary diagram for illustrating a control configuration for performing drive control of the fixing device 150 and the sheet discharge unit 180. The fixing rollers 151, the internal sheet discharge rollers 152, and the fixing sheet discharge rollers 153 are driven by the motor M1. The motor M1 is controlled to be driven by the motor controller 192. The fixing sheet discharge rollers 153 include a one-way clutch. In this manner, the sheet S nipped by the fixing sheet discharge rollers 153 can be pulled out by the sheet discharge unit 180 positioned downstream in the conveyance direction of the sheet S.

As illustrated in FIG. 3, the sheet discharge unit 180 includes pre-sheet discharge rollers 181, sheet discharge rollers 184, a sheet discharge sensor 183, and the flapper 182 for switching a sheet-discharge/duplex-printing path. As illustrated in FIG. 4, the pre-sheet discharge rollers 181 and the sheet discharge rollers 184 are driven by the motor M2. The motor M2 is controlled to be driven by the motor controller 193. The sheet S passes from the fixing device 150 through the sheet discharge unit 180 to be discharged to the sheet discharge trays 160 and 161 (see FIG. 1).

Vector Control

Figure 5:
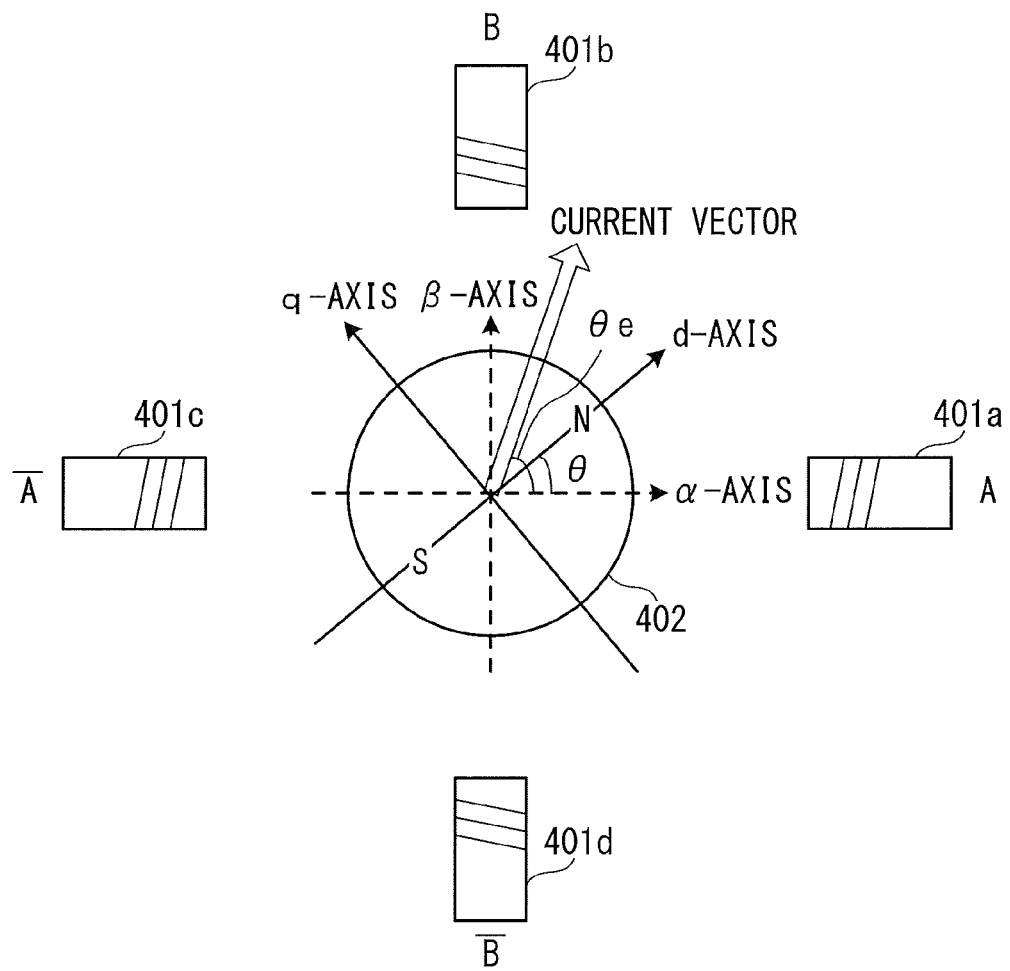
FIG. 5 is an explanatory diagram for illustrating a motor.
Figure 6:
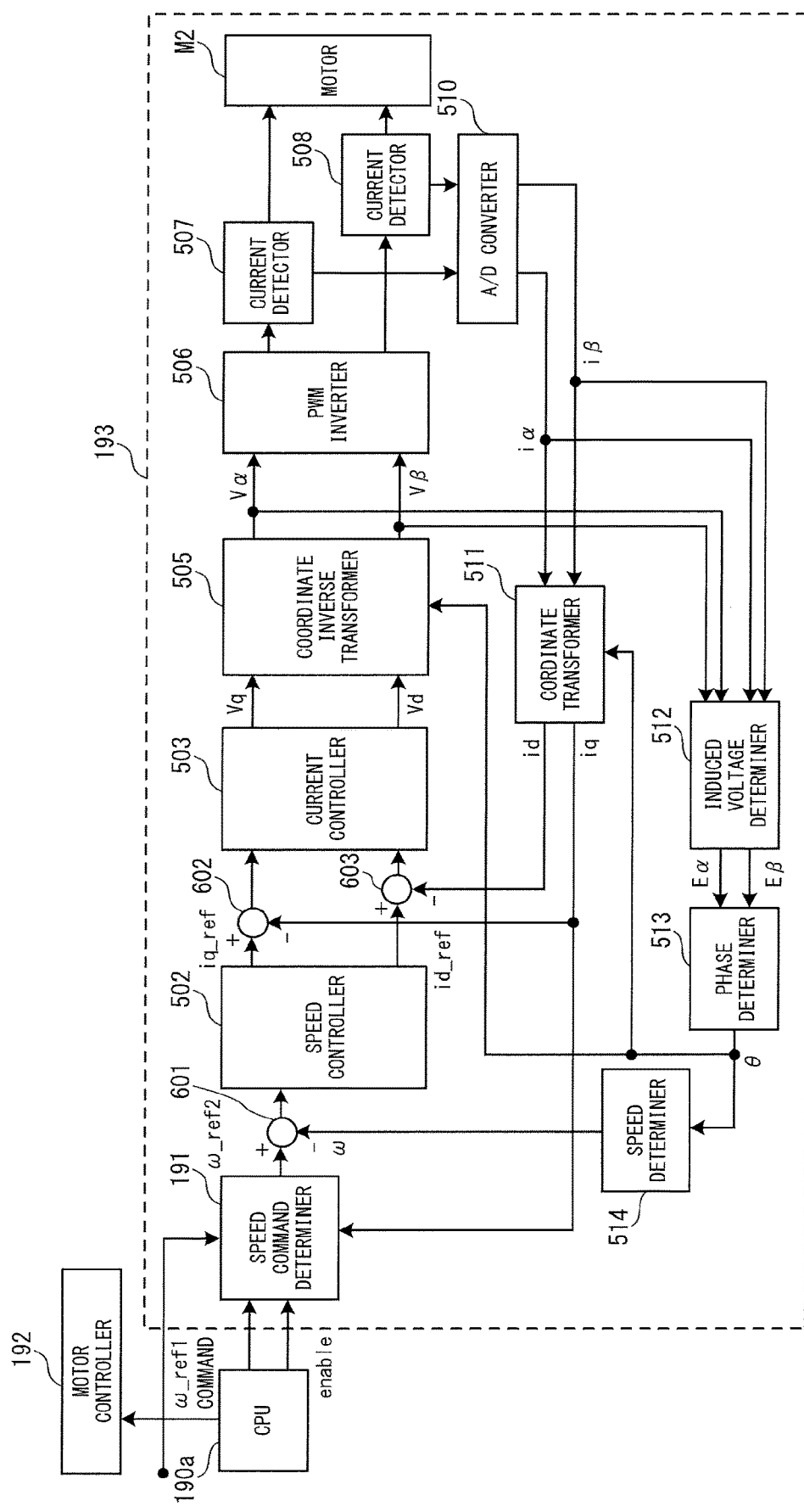
FIG. 6 is an exemplary diagram for illustrating a configuration of a motor controller.

The motor controller 193 is described. The motor controller 193 in the first embodiment controls the motor using vector control. With reference to FIG. 5 and FIG. 6, the vector control performed by the motor controller 193 in the first embodiment is described. The motor described below does not include a sensor such as a rotary encoder for detecting a rotation phase of a rotor of the motor, but may include a sensor such as a rotary encoder.

FIG. 5 is a diagram for illustrating a relationship between a stepping motor (hereinafter referred to as "motor") M2 having two phases of an A phase (first phase) and a B phase (second phase) and a rotating coordinate system represented by a d-axis and a q-axis. In FIG. 5, an $\alpha$-axis being an axis corresponding to an A-phase winding in a stationary coordinate system and a $\beta$-axis being an axis corresponding to a B-phase winding in a stationary coordinate system are defined. Further, in FIG. 5, the d-axis is defined along a direction of magnetic fluxes generated by magnetic poles of permanent magnets used in a rotor 402, and the q-axis is defined along a direction advancing 90 degrees counterclockwise from the d-axis (direction orthogonal to the d-axis). An angle formed between the $\alpha$-axis and the d-axis represents a rotation phase $\theta$ of the rotor 402. In the vector control, a rotating coordinate system having the rotation phase $\theta$ of the rotor 402 as a reference is used. Specifically, in the vector control, a q-axis component (torque current component) causing the rotor 402 to generate torque, and a d-axis component (excitation current component) affecting the intensity of the magnetic fluxes passing through windings 401a to 401d are used. The torque current component is a current component in the rotating coordinate system of a current vector corresponding to a drive current flowing through each of the windings 401a to 401d.

Vector control is a method of controlling the motor through speed feedback control of controlling the value of the torque current component and the value of the excitation current component so that a deviation between a command speed representing a target speed of the rotor 402 and an actual rotation speed is decreased.

Motor Control Device

FIG. 6 is a block diagram for illustrating an example of a configuration of the motor controller 193 configured to control the motor M2. The motor controller 193 is formed of at least one application specific integrated circuit (ASIC), and has respective functions described below. The motor controller 193 includes, as circuits configured to perform the vector control, a speed controller 502, a current controller 503, a coordinate inverse transformer 505, a coordinate transformer 511, and a PWM inverter 506 configured to supply drive currents to the windings 401a to 401d of the motor.

The coordinate transformer 511 transforms coordinates of a current vector corresponding to each of the drive currents flowing through the A-phase and B-phase windings 401a to 401d of the motor M2 from a stationary coordinate system represented by the $\alpha$-axis and the $\beta$-axis to the rotating coordinate system represented by the q-axis and the d-axis. As a result, the drive current flowing through each of the windings 401a to 401d is represented by a current value of a q-axis component (q-axis current) and a current value of a d-axis component (d-axis current), which are current values in the rotating coordinate system. The q-axis current corresponds to a torque current for causing the rotor 402 of the motor M2 to generate torque. The d-axis current corresponds to an excitation current affecting the intensity of the magnetic fluxes passing through the windings 401a to 401d of the motor M2. The motor controller 193 can each independently control the q-axis current and the d-axis current. As a result, the motor controller 193 can control the q-axis current in accordance with a load torque to be applied to the rotor 402 to efficiently generate torque required for rotating the rotor 402. That is, in the vector control, the magnitude of the current vector illustrated in FIG. 5 varies depending on the load torque to be applied to the rotor 402.

The motor controller 193 determines a rotation speed ω of the rotor 402 of the motor M2 by a method to be described later, and performs the vector control based on the determination result. The CPU 190a outputs a command for driving the motor M2 to a speed command determining unit 191, which acts as a speed command determiner. The command to be output from the CPU 190a includes a command speed ω_ref1 representing a target speed of the rotor 402 of the motor M2. The speed command determining unit 191 generates, based on the command speed ω_ref1, a command speed ω_ref2 representing the target speed of the rotor 402 of the motor M2 to output the command speed ω_ref2.

A subtractor 601 calculates a deviation between the command speed ω_ref2 and the rotation speed ω of the rotor 402 of the motor M2, which is output from a speed determining unit 514, which acts as a speed determiner, to output the deviation.

The speed controller 502 acquires the deviation output from the subtractor 601 in a period T (for example, 200 microseconds). The speed controller 502 generates, based on proportional control (P control), integral control (I control), and derivative control (D control), a q-axis current command value iq_ref and a d-axis current command value id_ref so that the deviation acquired from the subtractor 601 is decreased, and outputs the q-axis current command value iq_ref and the d-axis current command value id_ref. Specifically, the speed controller 502 generates, based on the P control, the I control, and the D control, the q-axis current command value iq_ref and the d-axis current command value id_ref so that the deviation acquired by the subtractor 601 becomes "0", and outputs the q-axis current command value iq_ref and the d-axis current command value id_ref. The P control is a control method of controlling a value to be controlled based on a value proportional to a deviation between a command value and an estimated value. The I control is a control method of controlling a value to be controlled based on a value proportional to a time integration of a deviation between a command value and an estimated value. The D control is a control method of controlling a value to be controlled based on a value proportional to a time change of a deviation between a command value and an estimated value.

The speed controller 502 in the first embodiment generates the q-axis current command value iq_ref and the d-axis current command value id_ref based on PID control, but the present disclosure is not limited thereto. For example, the speed controller 502 may generate the q-axis current command value iq_ref and the d-axis current command value id_ref based on PI control. When permanent magnets are used in the rotor 402, in general, the d-axis current command value id_ref affecting the intensity of the magnetic fluxes passing through the windings 401a to 401d is set to 0, but the present disclosure is not limited thereto.

The drive currents flowing through the A-phase and B-phase windings 401a to 401d of the motor M2 are detected by current detectors 507 and 508, and then are converted from an analog value to a digital value by an A/D converter 510. A period in which the current detectors 507 and 508 detect the currents is, for example, a period (for example, 25 microseconds) equal to or smaller than the period T in which the speed controller 502 acquires the deviation.

The current values of the drive currents subjected to conversion from the analog value to the digital value by the A/D converter 510 are expressed by the following expressions using a phase θe of the current vector illustrated in FIG. 5 as current values iα and iβ in the stationary coordinate system. The phase θe of the current vector is defined as an angle formed between the α-axis and the current vector. Further, I represents the magnitude of the current vector.

$$i\alpha = I^* \cos\theta e \quad (1)$$

$$i\beta = I^* \sin\theta e \quad (2)$$

Those current values iα and iβ are input to the coordinate transformer 511 and an induced voltage determiner 512.

The coordinate transformer 511 transforms the current values iα and iβ in the stationary coordinate system into a current value iq of the q-axis current and a current value id of the d-axis current in the rotating coordinate system by the following expressions.

$$id = \cos\theta^* i\alpha + \sin\theta^* i\beta \quad (3)$$

$$iq = -\sin\theta^* i\alpha + \cos\theta^* i\beta \quad (4)$$

The coordinate transformer 511 outputs the current value iq obtained by transformation to a subtractor 602 and the speed command determining unit 191. Further, the coordinate transformer 511 outputs the current value id obtained by transformation to a subtractor 603. The speed command determining unit 191 is described later.

The subtractor 602 calculates a deviation between the q-axis current command value iq_ref and the current value iq to output the deviation to the current controller 503. Further, the subtractor 603 calculates a deviation between the d-axis current command value id_ref and the current value id to output the deviation to the current controller 503.

The current controller 503 generates, based on the PID control, drive voltages Vq and Vd so that the input deviation is each decreased. Specifically, the current controller 503 generates the drive voltages Vq and Vd so that the input deviation each becomes "0" to output the drive voltages Vq and Vd to the coordinate inverse transformer 505. That is, the current controller 503 functions as means for generating the drive voltages Vq and Vd. The current controller 503 in the first embodiment generates the drive voltages Vq and Vd based on the PID control, but the present disclosure is not limited thereto. For example, the current controller 503 may generate the drive voltages Vq and Vd based on the PI control.

The coordinate inverse transformer 505 inversely transforms the drive voltages Vq and Vd in the rotating coordinate system, which are output from the current controller 503, to drive voltages Vα and Vβ in the stationary coordinate system by the following expressions.

$$V\alpha = \cos\theta^* Vd - \sin\theta^* Vq \quad (5)$$

$$V\beta = \sin\theta^* Vd + \cos\theta^* Vq \quad (6)$$

The coordinate inverse transformer 505 outputs the drive voltages Vα and Vβ obtained by inverse transformation to the induced voltage determiner 512 and the PWM inverter 506.

The PWM inverter 506 includes a full-bridge circuit. The full-bridge circuit is driven by a pulse width modulation (PWM) signal that is based on the drive voltages Vα and Vβ input from the coordinate inverse transformer 505. As a result, the PWM inverter 506 generates drive currents iα and iβ that are based on the drive voltages Vα and Vβ, and supplies the drive currents iα and iβ to the windings 401a to 401d having the respective phases of the motor M2, to thereby drive the motor M2. That is, the PWM inverter 506 functions as supply means for supplying currents to the windings 401a to 401d having the respective phases of the motor M2. In the first embodiment, the PWM inverter 506 includes the full-bridge circuit, but the PWM inverter 506 may be a half-bridge circuit or other circuits.

Next, a method of determining the rotation phase θ is described. For the determination of the rotation phase θ of the rotor 402, values of induced voltages Eα and Eβ induced in the A-phase and B-phase windings 401a to 401d of the motor M2 due to the rotation of the rotor 402 are used. The values of the induced voltages Eα and Eβ are determined (calculated) by the induced voltage determiner 512. Specifically, the induced voltages Eα and Eβ are determined by the following expressions based on the current values iα and iβ input from the A/D converter 510 to the induced voltage determiner 512 and the drive voltages Vα and Vβ input from the coordinate inverse transformer 505 to the induced voltage determiner 512.

$$E\alpha = V\alpha - R^* i\alpha - L^* di\alpha/dt \quad (7)$$

$$E\beta = V\beta - R^* i\beta - L^* di\beta/dt \quad (8)$$

In the expressions, R represents a winding resistance. L represents a winding inductance. The values of the winding resistance R and the winding inductance L are values unique to the used motor M2, and are stored in advance in the ROM 190b or a memory (not shown) or the like provided in the motor controller 193.

The induced voltages Eα and Eβ determined by the induced voltage determiner 512 are output to a phase determining unit 513, which acts as a phase determiner.

The phase determining unit 513 determines the rotation phase θ of the rotor 402 of the motor M2 by the following expression based on a ratio between the induced voltage Eα and the induced voltage Eβ that are output from the induced voltage determiner 512.

$$\theta = \tan^{-1}(E\beta/E\alpha) \quad (9)$$

In the first embodiment, the phase determining unit 513 determines the rotation phase θ by performing calculation based on Expression (9), but the present disclosure is not limited thereto. For example, the phase determining unit 513 may determine the rotation phase θ by referring to a table representing a relationship between the induced voltage Eα and the induced voltage Eβ, and the rotation phase θ corresponding to the induced voltage Eα and the induced voltage Eβ. The table is stored in the ROM 190b or the like.

The rotation phase θ of the rotor 402 obtained as described above is input to the coordinate inverse transformer 505, the coordinate transformer 511, and the speed determining unit 514.

The speed determining unit 514 determines the rotation speed ω of the rotor 402 based on the amount of change of the input rotation phase θ in a predetermined period. Specifically, the speed determining unit 514 determines the rotation speed ω of the rotor 402 based on Expression (10).

$$\omega = d\theta/dt \quad (10)$$

The rotation speed ω of the rotor 402 obtained as described above is input to the subtractor 601.

The motor controller 193 repeats the above-mentioned control.

As described above, the motor controller 193 in the first embodiment performs vector control of controlling the current values in the rotating coordinate system so that the deviation between the command speed ω_ref2 and the rotation speed ω is decreased. With the vector control, it is possible to suppress a motor step-out state, increase in motor noise due to surplus torque, and increase in power consumption.

Speed Command Determiner

As illustrated in FIG. 6, the CPU 190a outputs the command speed ω_ref1 to the motor controller 192 configured to control the motor M1. The motor controller 192 performs, for example, the above-mentioned vector control based on the command speed ω_ref1. The motor controller 192 may perform, for example, constant current control based on the command speed ω_ref1.

As illustrated in FIG. 6, the command speed ω_ref1 is also output to the speed command determining unit 191.

Figure 7:
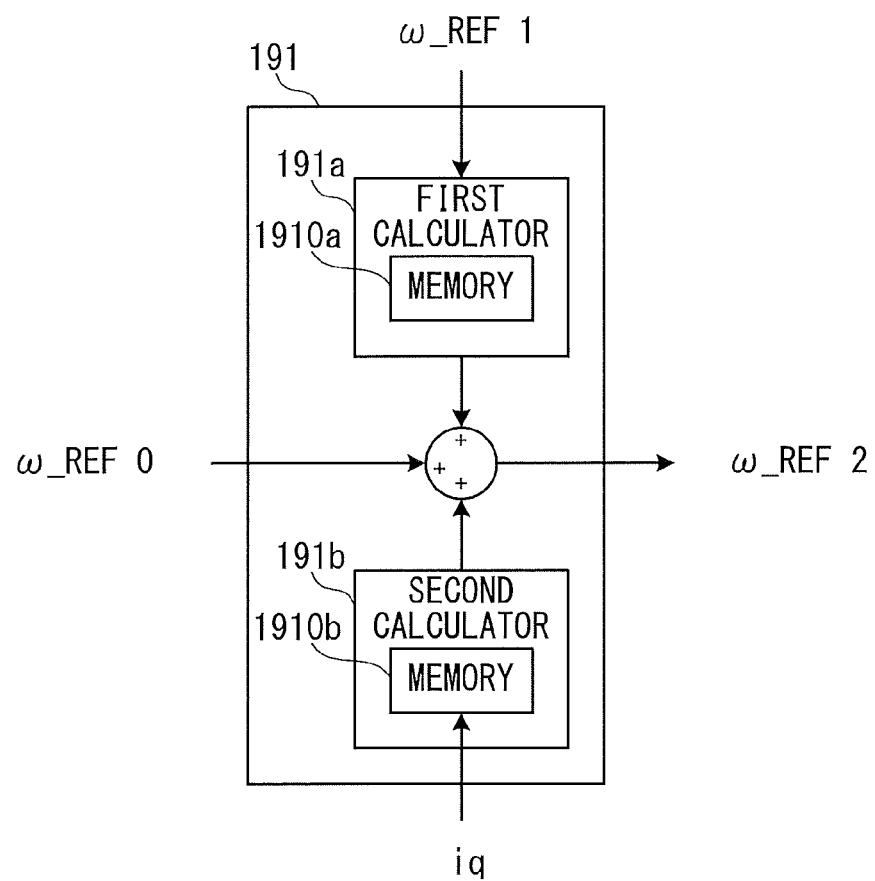
FIG. 7 is an explanatory diagram for illustrating a speed command determining unit.

Now, the speed command determining unit 191 is described. FIG. 7 is an explanatory diagram for illustrating the speed command determining unit 191. The speed command determining unit 191 includes a first calculator 191a and a second calculator 191b.

To the first calculator 191a, the command speed ω_ref1 of the motor M1 output from the motor controller 192 is input. As described above, the rotation of the fixing rollers 151 is controlled based on the loop amount of the sheet S detected by the sensor 108. That is, the command speed ω_ref1 changes depending on the loop amount of the sheet S.

The first calculator 191a includes a memory 1910a configured to store the input command speed ω_ref1, and updates the memory 1910a every time the command speed ω_ref1 is input.

The first calculator 191a generates a first adjustment value for adjusting a command speed ω_ref0 based on, for example, a value δω_ref obtained by subtracting the command speed ω_ref1 stored in the memory 1910a from the acquired command speed ω_ref1.

For example, in a case where the value δω_ref is negative (that is, in a case where the acquired command speed ω_ref1 is smaller than the command speed ω_ref1 stored in the memory 1910a), the first calculator 191a generates the first adjustment value as follows. Specifically, the first calculator 191a generates the first adjustment value so that the peripheral speed of the pre-sheet discharge rollers 181 is decreased by an amount corresponding to an amount of decrease of the peripheral speed of the fixing rollers 151, which decreases due to the decrease of the command speed ω_ref1 by the value δω_ref.

Further, for example, in a case where the value δω_ref is positive (that is, in a case where the acquired command speed ω_ref1 is faster than the command speed ω_ref1 stored in the memory 1910a), the first calculator 191a generates the first adjustment value as follows. Specifically, the first calculator 191a generates the first adjustment value so that the peripheral speed of the pre-sheet discharge rollers 181 is increased by an amount corresponding to an amount of increase of the peripheral speed of the fixing rollers 151, which increases due to the increase of the command speed ω_ref1 by the value δω_ref.

To the second calculator 191b, the current value iq output from the coordinate transformer 511 is input. The increase of the current value iq means increase in force of pulling the sheet S by the pre-sheet discharge rollers 181 downstream with respect to the fixing device 150. Further, the decrease of the current value iq means decrease in force of pulling the sheet S by the pre-sheet discharge rollers 181 downstream with respect to the fixing device 150. In the first embodiment, the tensioning or relaxing of the sheet S between the pre-sheet discharge rollers 181 and the fixing device 150 is detected using the current value iq, but instead of the current value iq, motor control information, for example, a rotor phase variation may be used.

The second calculator 191*b* includes a memory 1910*b* configured to store a reference value iq0 (predetermined value) of the current value iq. The reference value iq0 is, for example, an average value of the current value iq within a predetermined period under a state in which the motor M2 is controlled at the command speed ω_ref0 and plain paper is conveyed by the pre-sheet discharge rollers 181 and the fixing rollers 151, and is stored in advance in the memory 1910*b*. In this case, the fixing rollers 151 rotate at a peripheral speed corresponding to a sheet conveyance speed set in advance. In the first embodiment, the number of reference values stored in the memory 1910*b* is 1 (that is, the reference value does not depend on the sheet type), but reference values corresponding to sheet types may be stored in the memory 1910*b*.

The second calculator 191*b* generates a second adjustment value for adjusting the command speed ω_ref0 so that, for example, the acquired current value iq matches the reference value iq0 stored in the memory 1910*b*.

For example, in a case where the acquired current value iq is smaller than the reference value iq0 stored in the memory 1910*b*, the second calculator 191*b* generates the second adjustment value as follows. Specifically, the second calculator 191*b* generates the second adjustment value so that the peripheral speed of the pre-sheet discharge rollers 181 is increased by an amount corresponding to a differential value between the current value iq and the reference value iq0.

Further, for example, in a case where the acquired current value iq is larger than the reference value iq0 stored in the memory 1910*b*, the second calculator 191*b* generates the second adjustment value as follows. Specifically, the second calculator 191*b* generates the second adjustment value so that the peripheral speed of the pre-sheet discharge rollers 181 is decreased by an amount corresponding to a differential value between the current value iq and the reference value iq0.

The speed command determining unit 191 outputs the command speed ω_ref2 obtained by adding the first adjustment value calculated by the first calculator 191*a* and the second adjustment value calculated by the second calculator 191*b* to the command speed ω_ref0. The command speed ω_ref0 is, for example, a speed command value representing a speed of conveying the sheet S by the sheet discharge unit 180 in a case where the fixing rollers 151 are not thermally expanded.

After the trailing edge of the sheet S passes through the secondary transfer portion 103, fixing loop control is ended. Therefore, the speed command determining unit 191 does not perform the processing of adding the first adjustment value to the speed command value after the trailing edge of the sheet S passes through the secondary transfer portion 103. The timing at which the trailing edge of the sheet S passes through the secondary transfer portion 103 is determined based on, for example, the timing at which a registration sensor 101 detects the leading edge of the sheet S and on the length of the conveyed sheet S.

Figure 8:
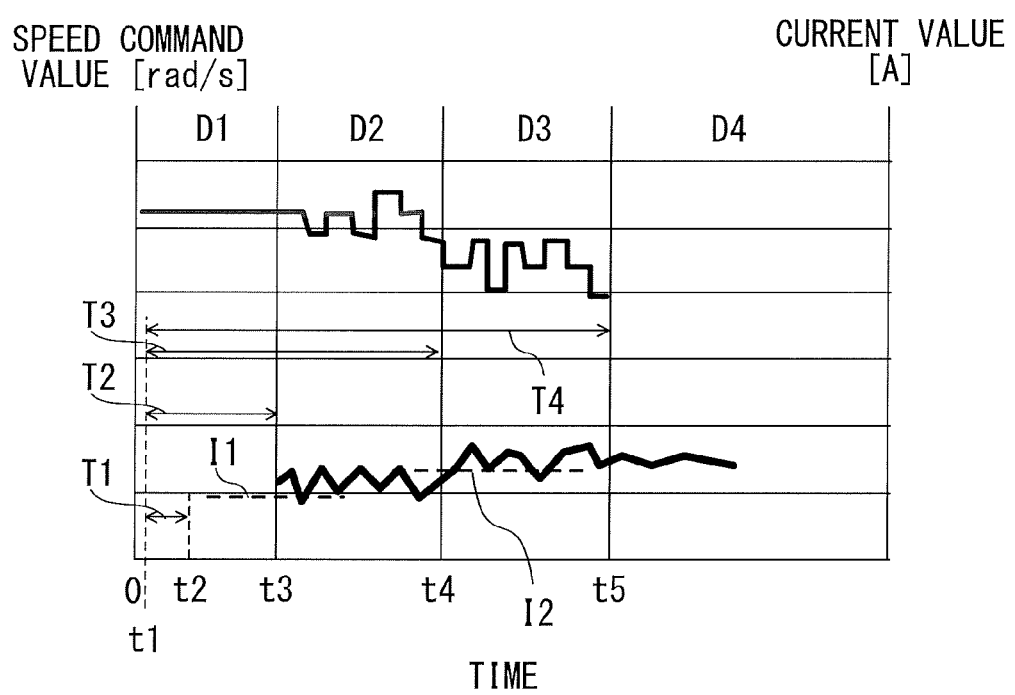
FIG. 8 is an explanatory graph for showing an operation of the motor.

FIG. 8 is a graph for showing an example of an operation of the motor M2. In FIG. 8, an example of change in speed command value of the motor M2 is shown on the upper part, and an example of change in current value (torque) of the motor M2 is shown in the lower part.

A time t1 is a time at which the registration sensor 101 detects the leading edge of the sheet. A time t2 is a time at which a predetermined time period T1 has elapsed from the time t1. The reference value iq0 is determined based on an average value of the current value iq during a period from the time t1 to the time t2. The time t2 is a time after the time t1 and before the timing at which the leading edge of the sheet reaches a nip portion of the pre-sheet discharge rollers 181.

A time t3 is a time at which a predetermined time period T2 has elapsed from the time t1. The predetermined time period T2 is a time period required for the leading edge of the sheet to reach the nip portion of the pre-sheet discharge rollers 181 from when the registration sensor 101 detects the leading edge of the sheet. The predetermined time period T2 is set in advance based on a conveyance distance and a conveyance speed from a position at which the registration sensor 101 detects the sheet to the nip portion of the pre-sheet discharge rollers 181. A period D1 from the time t1 to the time t3 is a period during which the leading edge of the sheet does not reach the nip portion of the pre-sheet discharge rollers 181.

A time t4 is a time at which a predetermined time period T3 has elapsed from the time t1. The predetermined time period T3 is a time period required for the trailing edge of the sheet to pass through the secondary transfer portion 103 from when the registration sensor 101 detects the leading edge of the sheet. The predetermined time period T3 is set in advance based on the conveyance distance and the conveyance speed from the position at which the registration sensor 101 detects the sheet to the secondary transfer portion 103, and on the length of the sheet S. A period D2 from the time t3 to the time t4 is a period during which the fixing loop control is performed.

A time t5 is a time at which a predetermined time period T4 has elapsed from the time t1. The predetermined time period T4 is a time period required for the trailing edge of the sheet to pass through the fixing sheet discharge rollers 153 from when the registration sensor 101 detects the leading edge of the sheet. The predetermined time period T4 is set in advance based on a conveyance distance and a conveyance speed from the position at which the registration sensor 101 detects the sheet to a nip portion of the fixing sheet discharge rollers 153, and on the length of the sheet S. A period D3 from the time t4 to the time t5 is a period required for the trailing edge of the sheet S to get out of the fixing sheet discharge rollers 153 from when the trailing edge of the sheet S gets out of the secondary transfer portion 103. Further, a period D4 after the time t5 is a period after the trailing edge of the sheet S gets out of the fixing sheet discharge rollers 153.

A current I1 is an average value of the current value iq of the motor M2 during a period from the time t1 to the time t2. A current I2 is the reference value iq0 determined based on the average value.

Figure 9:
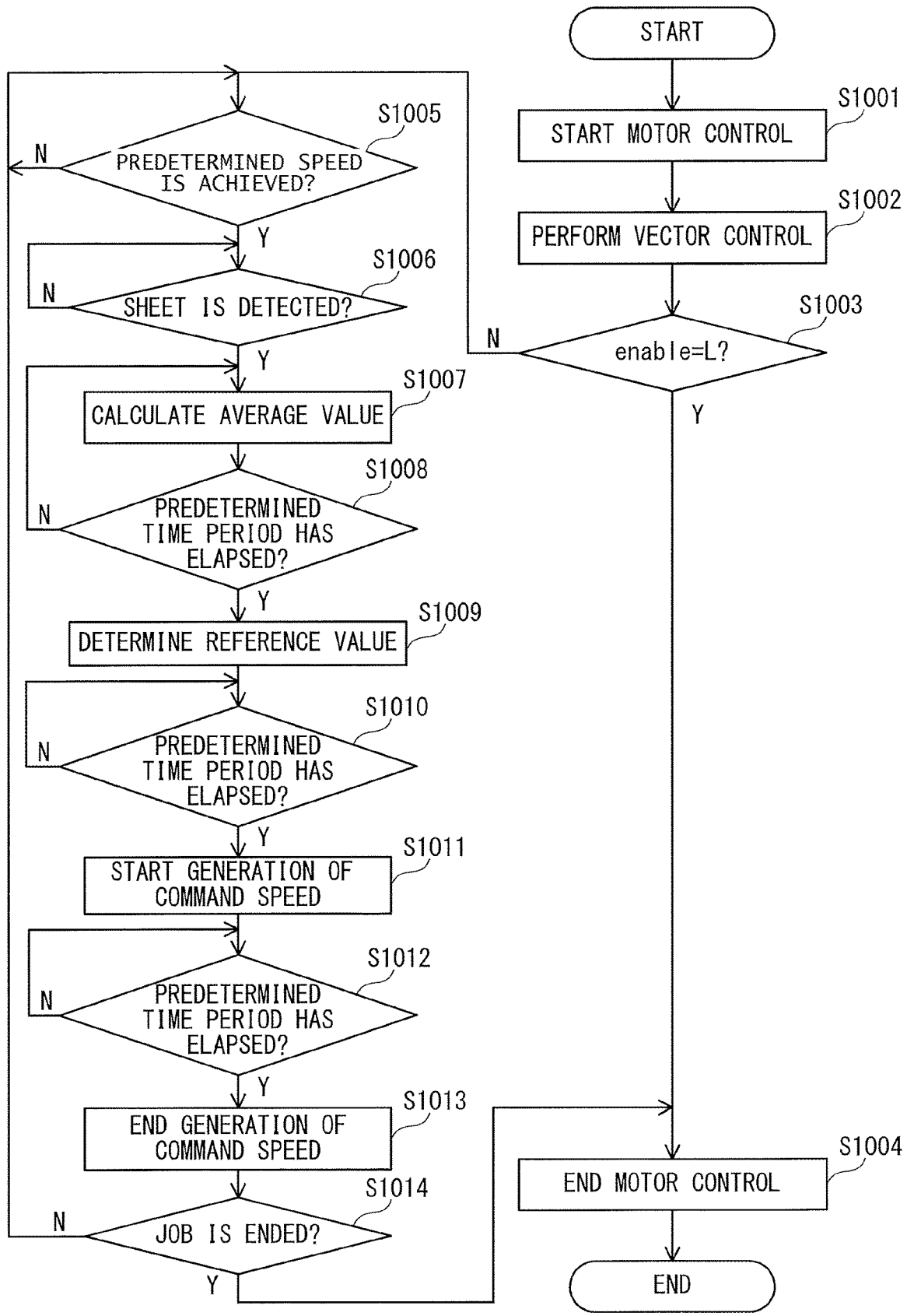
FIG. 9 is a flow chart for illustrating processing of controlling a rotation speed of the motor.

FIG. 9 is a flow chart for illustrating an example of processing of controlling the rotation speed of the motor M2. The processing illustrated in FIG. 9 is executed by the motor controller 193 that has received a command from the CPU 190*a*. The speed of conveying the sheet S by the sheet discharge unit 180 positioned downstream of the fixing device 150 in the conveyance direction of the sheet S is controlled through control of the rotation speed of the motor M2. In this manner, the sheet S is stably conveyed. While the flow chart of FIG. 9 is executed, the speed command determining unit 191 acquires the current value iq in a predetermined period. Further, in the first embodiment, while the flow chart of FIG. 9 is executed, the speed command determining unit 191 executes generation of the command speed ω_ref2 by the first calculator 191a (based on the first adjustment value).

When a printing job is started, the motor controller 193 starts control of the motor M2 (Step S1001), and performs the vector control (Step S1002).

Next, when the CPU 190a outputs an enable signal "L" to the motor controller 193 (Step S1003: Y), the motor controller 193 ends the control of the motor M2 (Step S1004). The enable signal is a signal for allowing or inhibiting the actuation of the motor controller 193. When the enable signal is "L (low level)", the CPU 190a inhibits the actuation of the motor controller 193. That is, the control of the motor M2 by the motor controller 193 is ended. When the enable signal is "H (high level)", the CPU 190a allows the actuation of the motor controller 193. The motor controller 193 controls the motor M2 based on the command output from the CPU 190a.

When the CPU 190a outputs the enable signal "H" to the motor controller 193 (Step S1003: N), and the motor M2 is driven at a predetermined speed (Step S1005: Y), the processing proceeds to Step S1006.

When the registration sensor 101 detects the leading edge of the sheet (Step S1006: Y), the motor controller 193 (speed command determining unit 191) calculates an average value of the input current value iq every time the current value iq is input (Step S1007). The motor controller 193 (speed command determining unit 191) stores the calculated average value in the memory 1910b, and updates the average value stored in the memory 1910b every time the average value is calculated.

After that, when the predetermined time period T1 has not elapsed from when the registration sensor 101 detects the leading edge of the sheet (Step S1008: N), the processing returns to Step S1007. When the predetermined time period T1 has elapsed from when the registration sensor 101 detects the leading edge of the sheet (Step S1008: Y), the motor controller 193 (speed command determining unit 191) determines the reference value iq0 based on the average value stored in the memory 1910b (Step S1009).

When the predetermined time period T2 has elapsed from when the registration sensor 101 detects the leading edge of the sheet (Step S1010: Y), the motor controller 193 (speed command determining unit 191) starts generation of the command speed ω_ref2 by the second calculator 191b (based on the second adjustment value) (Step S1011). That is, in Step S1011, the motor controller 193 (speed command determining unit 191) starts generation of the command speed ω_ref2 based on both of the first adjustment value and the second adjustment value.

When the predetermined time period T4 has elapsed from when the registration sensor 101 detects the leading edge of the sheet (Step S1012: Y), the generation of the command speed ω_ref2 by the second calculator 191b (based on the second adjustment value) is ended (Step S1013). That is, in Step S1013, the motor controller 193 (speed command determining unit 191) starts generation of the command speed ω_ref2 based on not the second adjustment value but the first adjustment value.

When the printing job is ended (Step S1014: Y), the processing proceeds to Step S1004, and the motor controller 193 ends the processing of the flow chart. Further, when the printing job is not ended (Step S1014: N), the processing returns to Step S1005.

Then, the motor controller 193 repeats the above-mentioned processing until the CPU 190a outputs the enable signal "L" or when the printing job is ended.

As described above, in the first embodiment, during the fixing loop control, the peripheral speed of the fixing rollers 151 (speed of the motor M1 is adjusted in accordance with the loop state of the sheet S. Then, the command speed ω_ref2 of the motor M2 is generated based on the command speed ω_ref1 of the motor M1. That is, the peripheral speed of the pre-sheet discharge rollers 181 is adjusted in accordance with the change in peripheral speed of the fixing rollers 151. As a result, it is possible to suppress damaging of the sheet S and an image formed on the sheet S due to the pre-sheet discharge rollers 181 slipping on the surface of the sheet S.

Further, in the first embodiment, the command speed ω_ref2 of the motor M2 is generated based on the current value iq of the motor M2 (based on the second adjustment value). As a result, it is possible to suppress damaging of the sheet S due to the pre-sheet discharge rollers 181 excessively pulling the sheet S nipped by the fixing rollers 151.

In the first embodiment, the command speed ω_ref1 of the motor M1 is input to the first calculator 191a, but the present disclosure is not limited thereto. For example, the motor controller 192 may have a configuration similar to that of the motor controller 193, that is, may include the induced voltage determiner 512, the phase determining unit 513, and the speed determining unit 514. A rotation speed ω1 of the rotor of the motor M1 may be estimated by the above-mentioned method, and the estimated rotation speed ω1 may be input to the first calculator 191a. That is, the first calculator 191a may be configured to generate the first adjustment value based on the command speed ω_ref1 or the rotation speed ω1 serving as a value corresponding to the rotation speed of the rotor of the motor M1.

Second Embodiment

Figure 10:
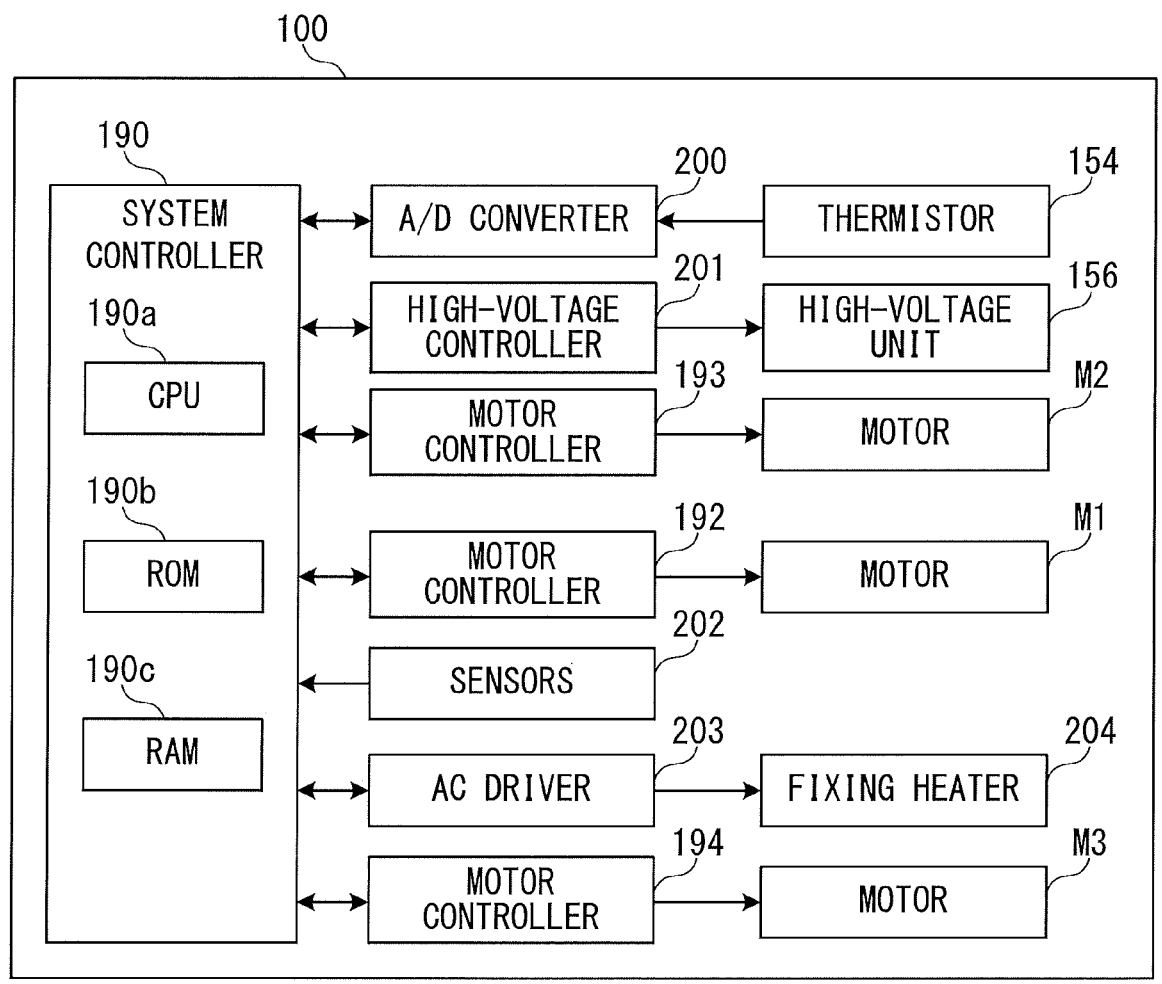
FIG. 10 is an exemplary diagram for illustrating a control configuration of the image forming apparatus.

FIG. 10 is an exemplary diagram for illustrating a control configuration of the image forming apparatus 100 according to a second embodiment of the present disclosure. The control configuration in the second embodiment is obtained by adding a motor controller 194 to the control configuration of FIG. 2. Description of configurations common to the control configuration of FIG. 2 is omitted.

The motor controller 194 controls a motor M3 configured to drive a load in accordance with the command output from the CPU 190a. In FIG. 10, only the motors M1, M2, and M3 are illustrated as the motors of the image forming apparatus 100, but the present disclosure is not limited thereto. Further, one motor controller may control a plurality of motors. In FIG. 10, only three motor controllers are provided, but the present disclosure is not limited to such a configuration.

Figure 11:
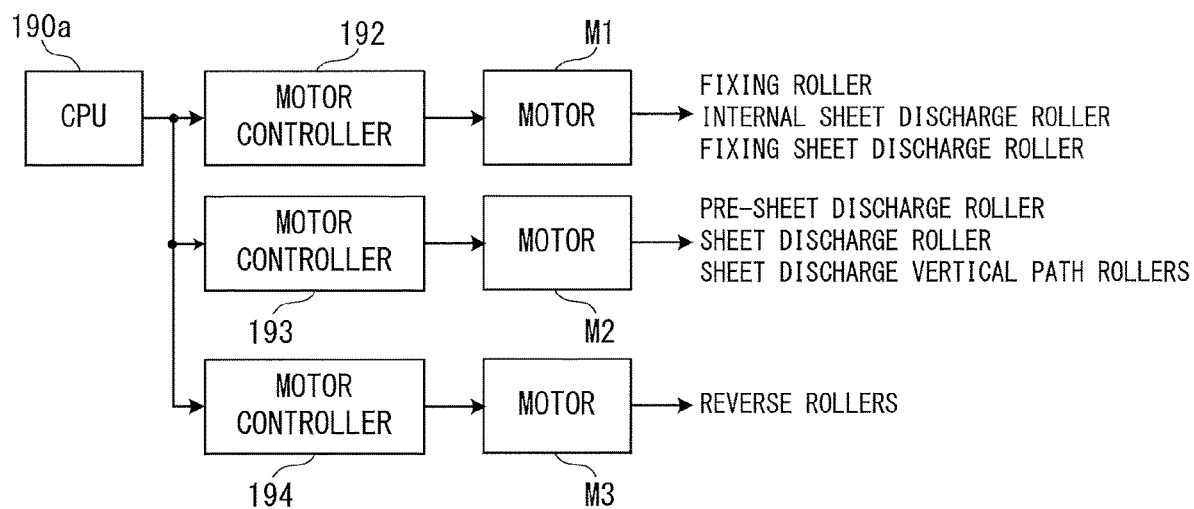
FIG. 11 is an exemplary diagram for illustrating a control configuration for performing drive control of the fixing device, the sheet discharge unit, and a reverse conveyance mechanism.

FIG. 11 is an exemplary diagram for illustrating a control configuration for performing drive control of the fixing device 150, the sheet discharge unit 180, and the reverse conveyance mechanism 162. FIG. 11 is an illustration of a configuration obtained by adding the motor controller 194 to the control configuration of FIG. 4. Description of configurations common to the control configuration of FIG. 4 is omitted.

The sheet S passes from the fixing device 150 through the sheet discharge unit 180 to be discharged to the sheet discharge trays 160 and 161 (see FIG. 1). Further, during conveyance for duplex printing, the sheet S is conveyed from the sheet discharge unit 180 to the reverse conveyance mechanism 162 including reverse rollers 164 to be driven by the motor M3. The motor M3 is controlled to be driven by the motor controller 194.

Figure 12:
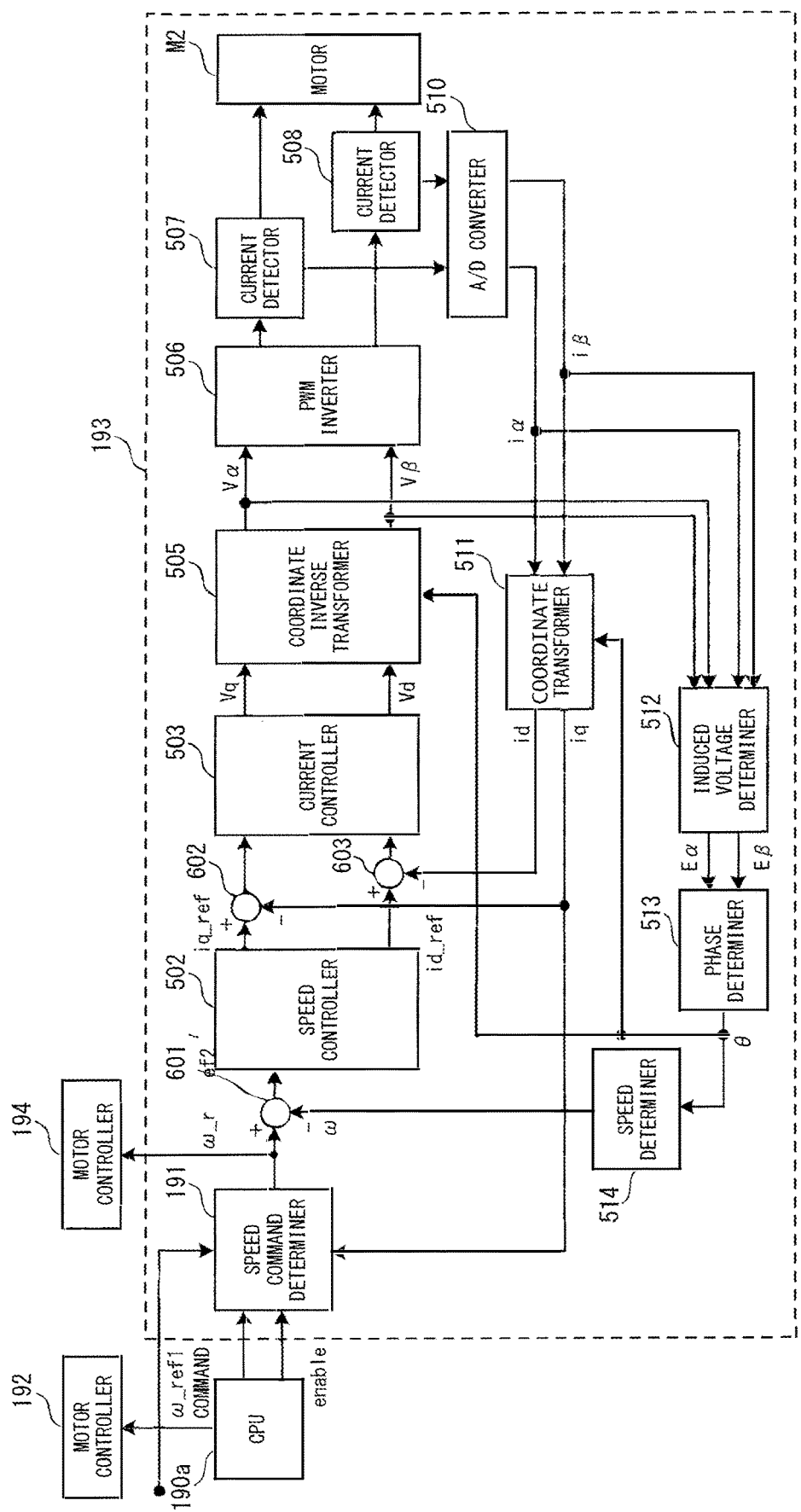
FIG. 12 is an exemplary diagram for illustrating a configuration of the motor controller.

FIG. 12 is an exemplary diagram for illustrating a configuration of the motor controller 193 configured to control the motor M2. The configuration of the motor controller 193 itself is similar to that illustrated in FIG. 6. However, the configuration of the motor controller 193 differs from that illustrated in FIG. 6 in that the command speed ω_ref2 output from the speed command determining unit 191 is also transmitted to the motor controller 194.

Reflection of Control to Reverse Rollers

Next, description is given of control of the motor M3 in a case where the sheet S is conveyed by sheet discharge vertical path rollers 185 and the reverse rollers 164. In the second embodiment, the control of the rotation speed of the motor M2 is reflected to (synchronized with) the control of the rotation speed of the motor M3.

As illustrated in FIG. 12, the command speed ω_ref2 output from the speed command determining unit 191 is input to the motor controller 194. The motor controller 194 controls the motor M3 configured to drive the reverse rollers 164 based on the command speed ω_ref2. The configuration of the motor controller 194 is similar to, for example, the configuration of the motor controller 193, and drives the motor M3 by vector control.

As described above, in the second embodiment, during the fixing loop control, the peripheral speed of the fixing rollers 151 (speed of the motor M1) is adjusted in accordance with the loop state of the sheet S. Then, the command speed ω_ref2 of the motor M2 is generated based on the command speed ω_ref1 of the motor M1. That is, the peripheral speed of the pre-sheet discharge rollers 181 is adjusted in accordance with the change in peripheral speed of the fixing rollers 151. As a result, it is possible to suppress damaging of the sheet S and an image formed on the sheet S due to the pre-sheet discharge rollers 181 slipping on the surface of the sheet S.

Further, in the second embodiment, the command speed ω_ref2 of the motor M2 is generated based on the current value iq of the motor M2 (based on the second adjustment value). As a result, it is possible to suppress damaging of the sheet S due to the pre-sheet discharge rollers 181 excessively pulling the sheet S nipped by the fixing rollers 151.

Further, in the second embodiment, the control of the rotation speed of the motor M2 is reflected to (synchronized with) the control of the rotation speed of the motor M3. In this manner, it is possible to suppress deflection of the sheet S between the sheet discharge vertical path rollers 185 and the reverse rollers 164.

In the first embodiment and the second embodiment, description has been given of tensioning or relaxing of the sheet S between the fixing rollers 151 and the sheet discharge rollers 184, but the application of the first embodiment and the second embodiment is not limited to the relationship between the fixing rollers 151 and the sheet discharge rollers 184. For example, the first embodiment and the second embodiment can also be applied to the tensioning or relaxing between the duplex printing rollers and the registration rollers. This point is described below.

Figure 13:
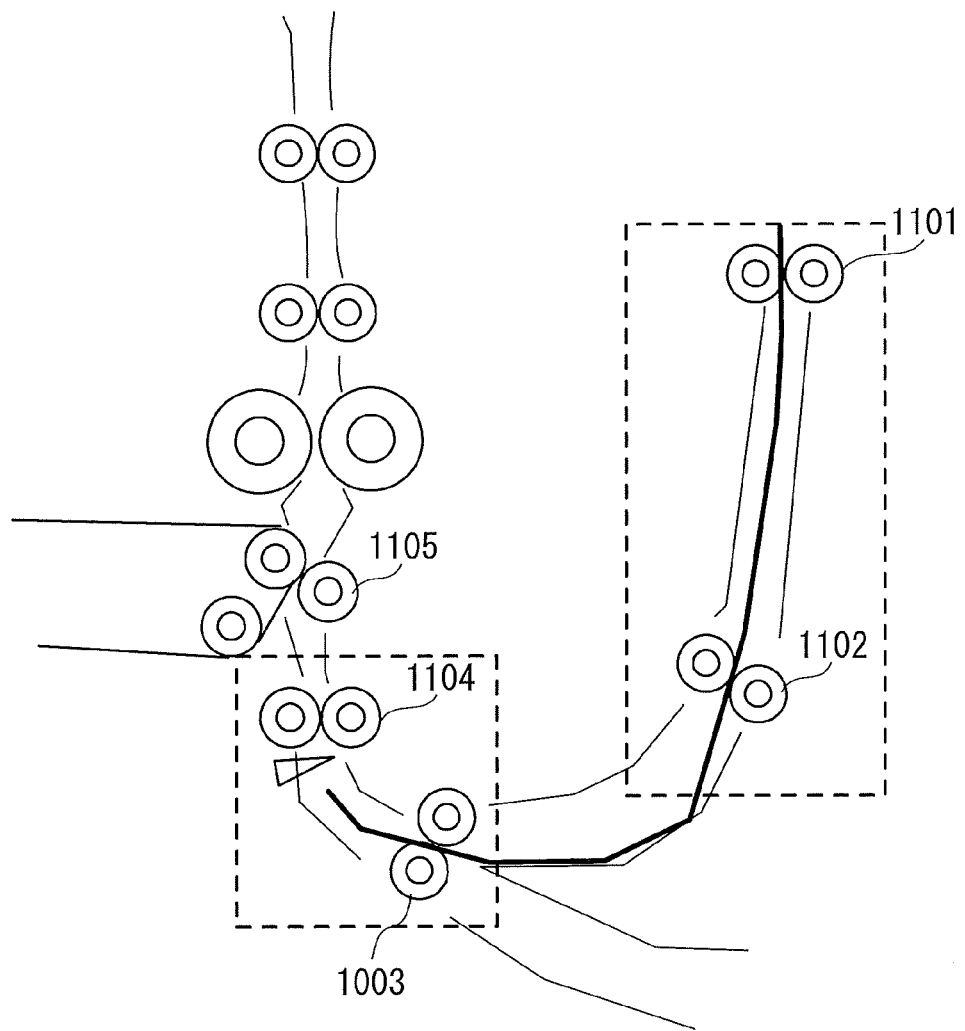
FIG. 13 is a diagram for illustrating an example of a sheet conveyance apparatus configured to respond to tensioning or relaxing between duplex printing rollers and registration rollers.

FIG. 13 is a diagram for illustrating an example of a configuration of the duplex printing rollers and the registration rollers. A duplex printing conveyance portion includes duplex printing intermediate rollers 1101 and duplex printing lower rollers 1102 that are equally driven. Downstream of the duplex printing conveyance portion, pre-registration rollers 1103 and registration rollers 1104 that are equally driven are provided. The sheet S gets out of the registration rollers 1104, and is then transmitted to secondary transfer rollers 1105.

In this case, the duplex printing intermediate rollers 1101 and the duplex printing lower rollers 1102 that convey the sheet S are driven by a motor M4, and the pre-registration rollers 1103 and the registration rollers 1104 that are arranged downstream thereof are driven by a motor M5.

Each roller is heated by the sheet subjected to fixing. Thus, an actual speed of the roller varies due to expansion of the diameter or wear caused by usage.

In view of the above, for example, the motor M5 is controlled by a method similar to the above-mentioned method of controlling the motor M2. Specifically, for example, even when the peripheral speeds of the duplex printing intermediate rollers 1101 and the duplex printing lower rollers 1102 change, the speed command value of the motor M4 is fed back to the speed command determining unit in the motor controller configured to control the motor M5. As a result, the peripheral speeds of the pre-registration rollers 1103 and the registration rollers 1104 are adjusted to appropriate values in accordance with the change in peripheral speeds of the duplex printing intermediate rollers 1101 and the duplex printing lower rollers 1102. As a result, it is possible to suppress damaging of the sheet S and an image formed on the sheet S due to the pre-registration rollers 1103 and the registration rollers 1104 slipping on the surface of the sheet S.

Further, with speed control using the current value (torque) of the motor M5, the rotation speeds of the pre-registration rollers 1103 and the registration rollers 1104 are adjusted to appropriate values with respect to the rotation speeds of the duplex printing intermediate rollers 1101 and the duplex printing lower rollers 1102. As a result, it is possible to suppress damaging of the sheet due to the pre-registration rollers 1103 and the registration rollers 1104 slipping on the surface of the sheet.

The embodiments described above are only provided to specifically describe the present disclosure, and the scope of the present disclosure is not limited to those examples.

The speed command value ω_ref0 (see FIG. 7) before adjustment of the pre-sheet discharge rollers 181 and the sheet discharge rollers 184 may be larger than the speed command value of the fixing rollers 151. In this case, the speeds of the pre-sheet discharge rollers 181 and the sheet discharge rollers 184 are set so that the pre-sheet discharge rollers 181 and the sheet discharge rollers 184 always pull the sheet S with respect to the fixing rollers 151. With such a setting, immediately after the leading edge of the sheet S enters the pre-sheet discharge rollers 181, or immediately after the speed control using the current value of the motor M2 is performed, further relaxing of the sheet S due to the delay of control is prevented.

The reference value iq0 may be set to, for example, an average value of the current value iq during the period from the time t1 to the time t2, or may be set to a value larger than the average value.

Further, in the first embodiment and the second embodiment, the reference value iq0 is set based on the average value of the current value iq in the motor M2 within a predetermined period in a period in which the pre-sheet discharge rollers 181 are rotated at a predetermined speed under a state in which the pre-sheet discharge rollers 181 do not nip the sheet, but the present disclosure is not limited thereto.

For example, the reference value iq0 may be set under a state in which the motor M2 is controlled based on the command speed ω_ref0 and plain paper is conveyed by the pre-sheet discharge rollers 181 and the fixing rollers 151 rotating at a peripheral speed corresponding to a sheet conveyance speed set in advance. The reference value iq0 is set based on the average value of the current value iq in the motor M2 within a predetermined period in a period in which the pre-sheet discharge rollers 181 are rotating at a predetermined speed under this state.

Further, the reference value iq0 may be set based on, for example, the current value iq during a period from when the trailing edge of the sheet nipped by the pre-sheet discharge rollers 181 gets out of the nip portion of the fixing sheet discharge rollers 153 to when the trailing edge of the sheet gets out of the nip portion of the pre-sheet discharge rollers 181. The reference value iq0 is set based on the average value of the current value iq in the motor M2 within a predetermined period in this period. That is, the reference value iq0 may be set based on the average value of the current value iq in the motor M2 within a predetermined period in the period in which the pre-sheet discharge rollers 181 are rotating at a predetermined speed under a state in which the pre-sheet discharge rollers 181 are nipping the sheet.

Further, in the first embodiment and the second embodiment, the pre-sheet discharge rollers 181 are used as a configuration for discharging the sheet having an image fixed thereon by the fixing device 150 to the outside of the apparatus, but the present disclosure is not limited thereto. For example, a conveyance belt may be used as the configuration for discharging the sheet having an image fixed thereon by the fixing device 150 to the outside of the apparatus. When the conveyance belt is used, the rotation speed of the conveyance belt is adjusted based on the current value iq in the motor driving a roller configured to drive to rotate the conveyance belt.

Figure 14:
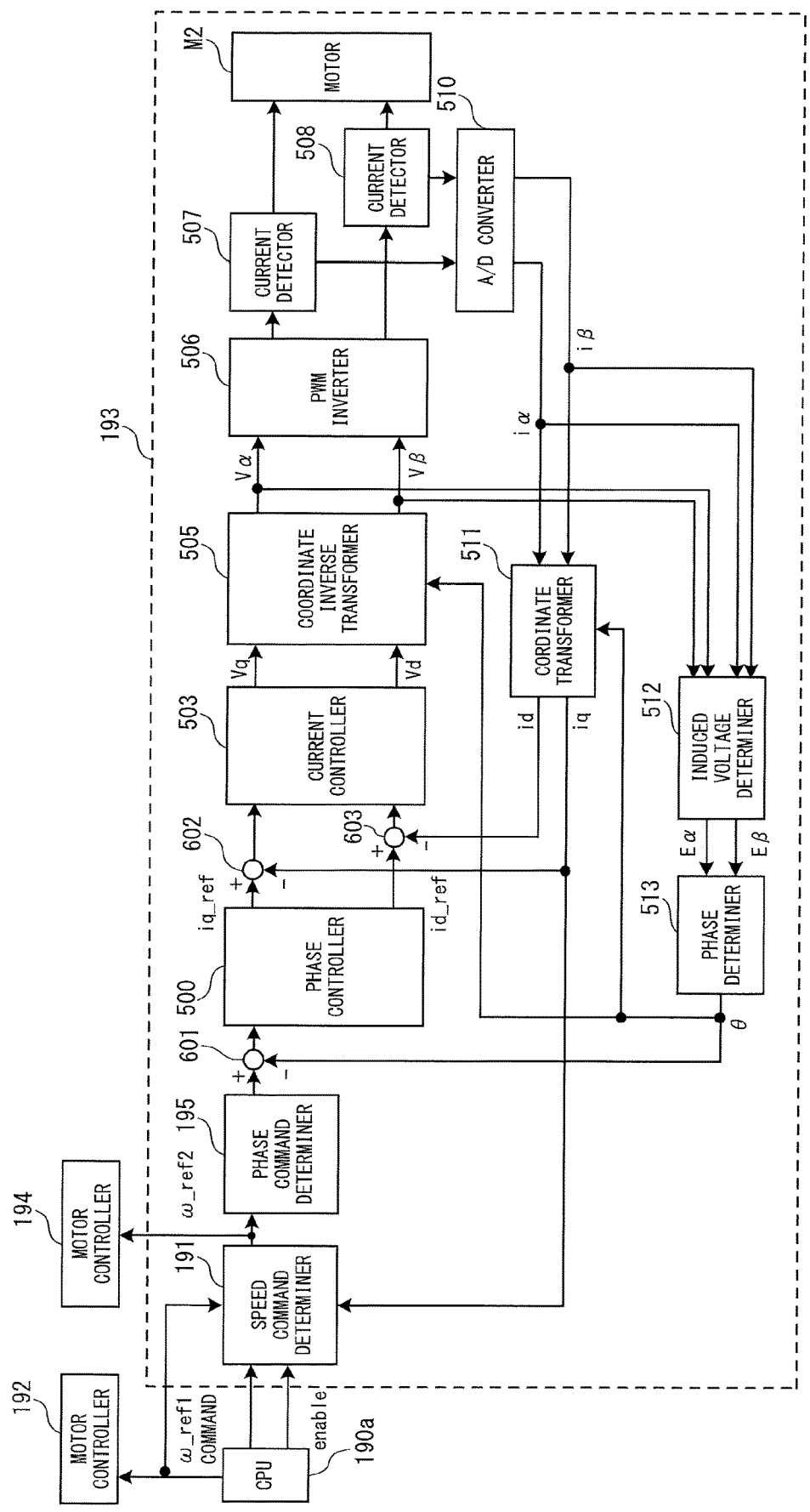
FIG. 14 is an exemplary diagram for illustrating a configuration of the motor controller.

Further, the motor controller in the first embodiment and the second embodiment controls the motor by speed feedback control, but the present disclosure is not limited thereto. The motor controller may be configured to control the motor by phase feedback control. Specifically, for example, as illustrated in FIG. 14, a phase command determining unit 195 may generate a command phase θ_ref representing a target phase of the rotor based on the command speed ω_ref2 generated by the speed command determining unit 191, and output the command phase θ_ref. A phase controller 500 may generate the q-axis current command value iq_ref and the d-axis current command value id_ref based on the deviation between the command phase θ_ref and the rotation phase θ determined by the phase determining unit 513, and output the q-axis current command value iq_ref and the d-axis current command value id_ref.

In the first embodiment and the second embodiment, a stepping motor is used as the motor, but the motor may be a DC motor or other motors. Further, the motor is not limited to be a two-phase motor, and the embodiments of the present disclosure are applicable even when the motor is a three-phase motor or other motors. Further, permanent magnets are used for the rotor 402, but the present disclosure is not limited thereto.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-207517, filed Oct. 26, 2017, No. 2018-034336, filed Feb. 28, 2018, and No. 2018-136767, filed Jul. 20, 2018 which are hereby incorporated by reference herein in their entirety.

What is claimed is:

1. An image forming apparatus, comprising:
an image forming portion configured to form an image on a sheet;
a first rotary member configured to fix the image formed on the sheet by the image forming portion to the sheet by heat;
a first motor configured to drive the first rotary member;
a second rotary member disposed downstream of the first rotary member in a conveyance direction in which the sheet is conveyed, and configured to convey the sheet having the image fixed thereon by the first rotary member;
a second motor configured to drive the second rotary member;
a third rotary member disposed upstream of the first rotary member with respect to the conveyance direction, the third rotary member configured to transfer the image onto the sheet;
a sensor configured to detect an amount of deflection of the sheet deflecting between the first rotary member and the third rotary member in the conveyance direction; and
at least one processor configured:
to determine a rotation phase of a rotor of the second motor;
to determine a target speed of the rotor; and
to control a drive current flowing through a winding of the second motor based on the target speed by vector control, the vector control controlling the drive current based on a torque current component and an excitation current component, the torque current component, which causes the rotor to generate torque, being a current component represented by a rotating coordinate system based on the determined rotation phase, and the excitation current component, which affects intensity of magnetic fluxes passing through the winding, being a current component represented by the rotating coordinate system,
wherein the at least one processor is configured to determine the target speed based on a value corresponding to a load torque applied to the rotor, and
wherein the at least one processor is configured to control the first motor driving the first rotary member so that the amount of deflection matches a predetermined amount under a state in which the sheet is conveyed between the first rotary member and the third rotary member in the conveyance direction.

2. The image forming apparatus according to claim 1, wherein the at least one processor is configured to determine the target speed so that a differential value between the value corresponding to the load torque applied to the rotor and a value corresponding to a predetermined torque is decreased.

3. The image forming apparatus according to claim 2, wherein the value corresponding to the predetermined torque is set based on the value corresponding to the load torque applied to the rotor under a state in which the sheet is conveyed by the first rotary member and the second rotary member.

4. The image forming apparatus according to claim 1, wherein the at least one processor is configured to:
control the drive current, in a case in which the determined target speed is greater than a first value, based on the first value as the target speed; and
control the drive current, in a case in which the determined target speed is less than a second value that is less than the first value, based on the second value as the target speed.

5. The image forming apparatus according to claim 1, further comprising a detector configured to detect the drive current flowing through the winding,
wherein the value corresponding to the load torque applied to the rotor is a value of the torque current component of the drive current detected by the detector.

6. The image forming apparatus according to claim 1, wherein the at least one processor is configured to:
determine, in a case in which the value corresponding to the load torque is increased, a speed obtained by adding a speed corresponding to an amount of increase of the value corresponding to the load torque to the target speed as the target speed; and
determine, in a case in which the value corresponding to the load torque is decreased, a speed obtained by adding a speed corresponding to an amount of decrease of the value corresponding to the load torque to the target speed as the target speed.

7. The image forming apparatus according to claim 1, wherein the at least one processor is configured to determine a rotation speed of the rotor, and
wherein the vector control controls the drive current so that a difference between the target speed and the determined rotation speed is decreased based on the torque current component and the excitation current component.

8. The image forming apparatus according to claim 1, wherein the at least one processor is configured to determine a target phase of the rotor based on the determined target speed, and
wherein the vector control controls the drive current so that a difference between the target phase and the determined rotation phase is decreased based on the torque current component and the excitation current component.

* * * * *